Nov. 29, 1966 — H. ASHER — 3,287,934
UNIVERSAL JOINTS AND COUPLINGS
Filed May 5, 1964 — 3 Sheets-Sheet 1

INVENTOR:
HARRY ASHER.
BY
ATTORNEY

Nov. 29, 1966     H. ASHER     3,287,934
UNIVERSAL JOINTS AND COUPLINGS
Filed May 5, 1964     3 Sheets-Sheet 2

INVENTOR:
HARRY ASHER
BY
ATTORNEY

Nov. 29, 1966  H. ASHER  3,287,934
UNIVERSAL JOINTS AND COUPLINGS

Filed May 5, 1964  3 Sheets-Sheet 3

INVENTOR:
HARRY ASHER.
BY

ATTORNEY.

United States Patent Office 3,287,934
Patented Nov. 29, 1966

3,287,934
UNIVERSAL JOINTS AND COUPLINGS
Harry Asher, Thorntonville, Cleckheaton, England, assignor to Holset Engineering Company Limited, Huddersfield, England, a British company
Filed May 5, 1964, Ser. No. 365,053
Claims priority, application Great Britain, May 14, 1963, 18,985/63
9 Claims. (Cl. 64—21)

This invention relates to power transmission couplings or joints for shafts and the like, providing accommodation for the angular misalignment of the connecting shafts and, in particular relates to those types of universal joints or coupling in which torque is transmitted through balls operating in grooves or pockets between the inner and outer members of the coupling or joint.

It has already been proposed in a ball universal joint which gives cyclic regularity of transmitted motion, to constrain the balls to operate in grooves in both the inner and outer members, so that when relative tilt occurs between these two members the ball takes up a median angle of tilt. In this way, contact is always maintained between the balls and the grooves of the inner and outer members at all angles of tilt, and torque and motion transmission from the driving to the driven parts of the coupling is smooth and regular. However, in order to maintain this full contact of the balls the grooves are of a longitudinally circular or arc shape so that the balls move, when taking up their median position, in an arc about the theoretical centre of the occurring tilt.

In another prior construction of ball universal joint the balls are contained in pockets in the inner member and move in grooves in the outer member which are longitudinally straight, the balls not moving to a median position of tilt but moving to a full angular tilt position and accommodation is made in the cross-sectional shape of the groove to provide cyclic regularity of motion and torque transmission. In this type of joint the balls disengage and re-engage the grooves of the outer member in certain parts of their rotation.

The object of the present invention is to provide a universal joint or a coupling having the advantages of both the aforementioned types of joint in which cyclic regularity is maintained but in which the ball does not disengage the groove in the second instance and in which full contact of the ball with its inner and outer members is maintained at all times without the necessity for longitudinally curved grooves.

According to the present invention there is provided a universal joint or coupling comprising an outer member, an inner member, an annular set of balls each engaged in a groove in the outer member and a groove in the inner member, each of said grooves extending in the axial direction of the said members and having a cross-sectional form which closely fits the diameter of the ball, and means for locating all the balls with their centres on a common plane, said ball locating means also having spherical internal and external surfaces which control the articulation centre of the joint.

The invention will be described further, by way of example, with reference to the accompanying diagrammatic drawings, wherein.

Figure 1:
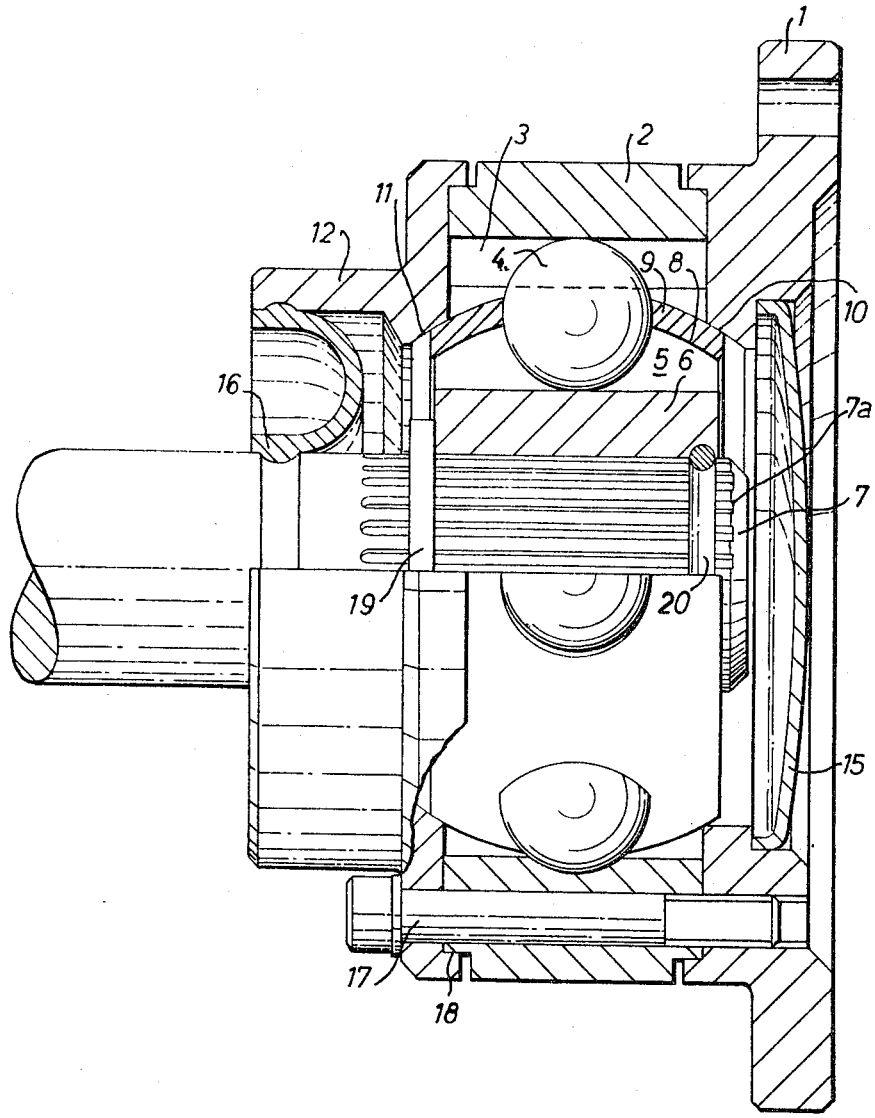
FIG. 1 is an elevation, partly in section on the line I—I of FIG. 2 of a universal joint or coupling embodying the invention.

Referring to FIG. 1 a driving flange 1 has bolted to it an outer member or sleeve 2 in which are cut a series of straight, axially directed grooves 3, equally pitched about the internal circumference of the outer member 2 and wherein are engaged a number of steel balls 4 which in turn engage in longitudinally straight grooves 5 cut in an inner member 6 which is supported upon and connected to a shaft 7 by splines 7a.

Figure 2:
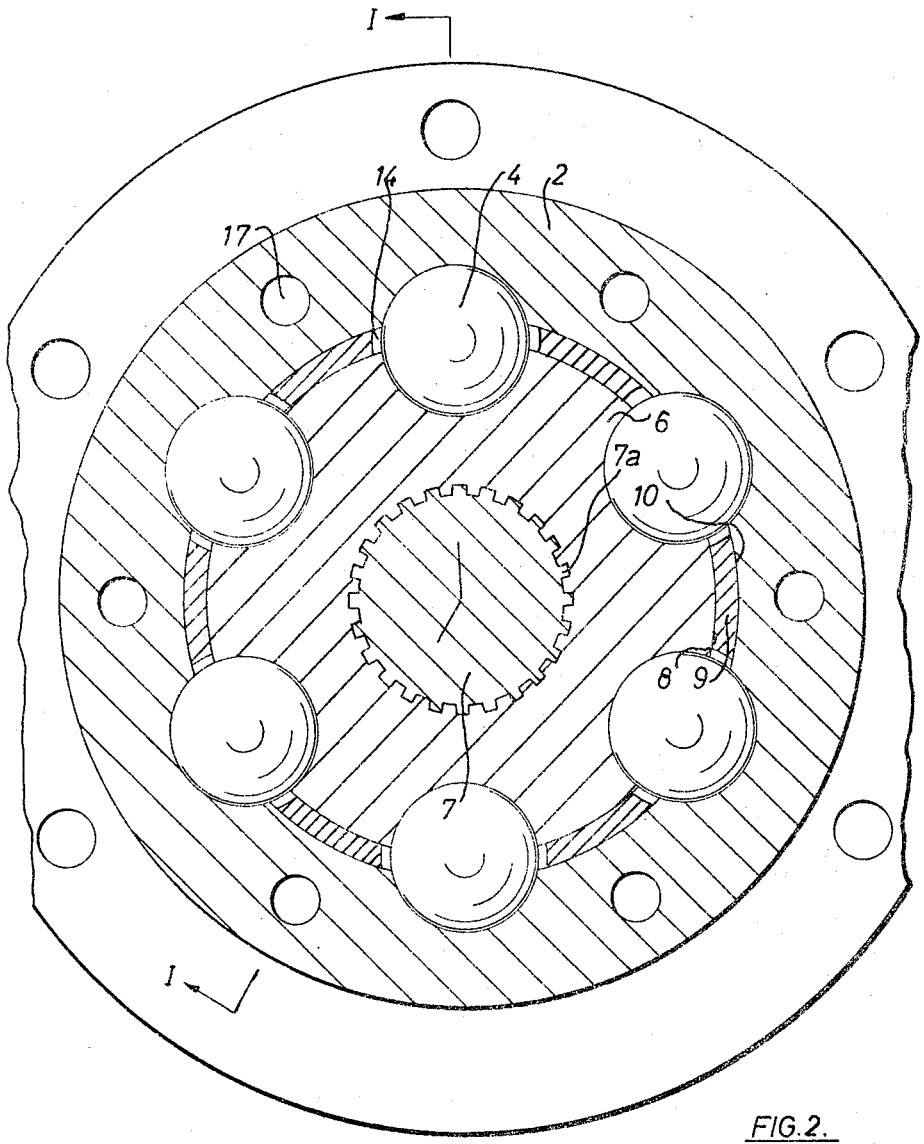
FIG. 2 is an axial view thereof.

In the condition of no tilt shown in FIG. 1 torque applied to the driving flange 1 would be passed through the intervening components to the shaft 7. Although as shown in FIG. 2, six equally spaced balls and corresponding grooves are provided, the invention relates to any number of balls and corresponding grooves including odd numbers of balls and grooves provided they are equally spaced.

The inner member 6 has a spherical outer surface 8, and member 6 together with its related shaft 7 are held in concentricity with the outer member 2 by the spherical surface 8 bearing against an inner spherical surface of a part-spherical cage 9 which in turn bears against spherical surfaces 10 and 11 provided on the driving flange 1 and a cover 12 at the opposite end of the joint. Besides centering and locating the inner member 6, cage 9 has another function in that by means of holes 13 cut in its circumference it can locate and guide the balls so that under any tilt condition all balls occupy the same plane of rotation. These holes 13 are so made as to be an accurate fit on the longitudinal section of the ball as shown in FIG. 1 but to have clearance 14 in the circumferential length of the cage to allow the ball to move sideways as necessary to find accurate centering between the grooves of the inner and outer members.

Figure 5:
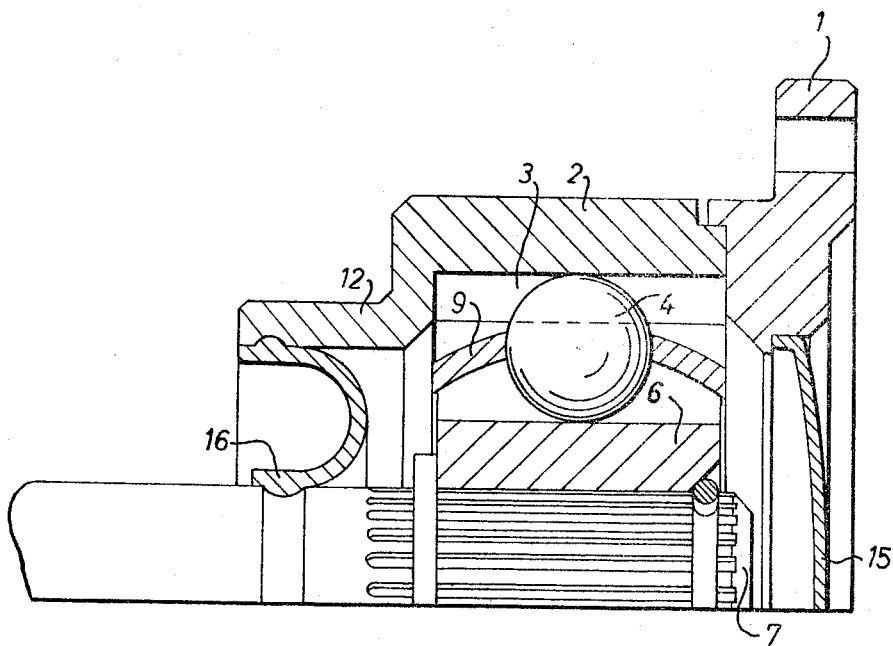
FIG. 5 is a sectional elevation of the upper half of a modified joint wherein the inner member is axially free in relation to the outer member so that axial freedom of movement, within limits of construction, may be accommodated.

A cover 15 and a seal 16 provide for the exclusion of dirt and enable lubrication to be self-contained within the joint. Further the components 12, 2 and 1 are made to form a continuous outer casing by bolts 17 holding them together locating at spigots 18 for concentricity. However it would be possible alternatively for two or more of the components forming the outer casing of the joint to be manufactured in one piece in which case the bolts and spigot may not be necessary. This alternative casing is shown in FIG. 5, where components 12 and 2 are made as one integral piece. The construction shown in FIG. 1 enables the simplest possible method of cutting the grooves through a single centre piece to be achieved.

In order to retain the shaft 7 in accurate location with the inner member 6 a circlip 19 provides an abutment and a collapsing and expanding ring 20 enables the shaft to be locked in position. However it is possible in some circumstances to combine the inner member with its shaft in which case no splining, circlip or locking spring is required.

Figure 3:
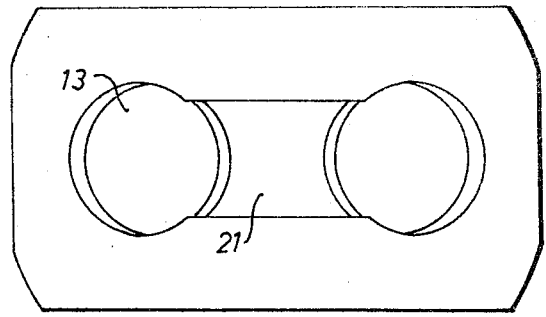
FIG. 3 is a projected view of the ball retaining cage.

In the projected view of the ball cage shown in FIG. 3 a slot 21 is cut between two adjacent ball retaining holes 13 to enable the one piece ball cage 9 to be assembled on to the inner member 6. For this purpose it is necessary that the width of the slot 21 shall not be less than the thickness of metal between two adjacent grooves in the inner member 6.

Figure 4:
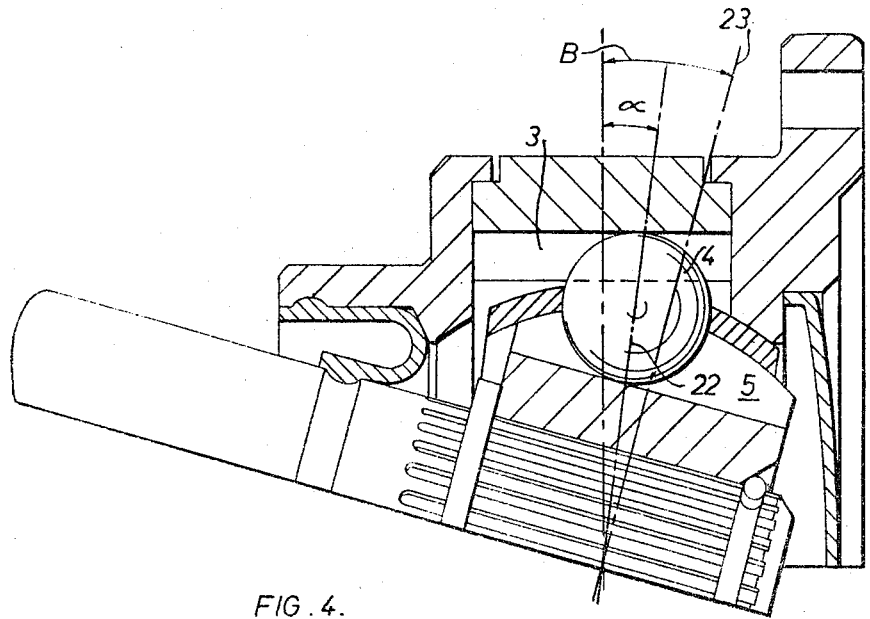
FIG. 4 is a view similar to the upper half of FIG. 1 but showing the joint under tilt conditions.

In FIG. 4 the joint is shown displaced through an angle of tilt $\beta$ and it will be seen that the ball 4 in occupying a median angle of tilt $\alpha$ is in satisfactory contact between the groove 3 in the outer member and the groove 5 in the inner member. The plane of all the balls will now be on the bisector 22 at angle $\alpha$ from the vertical plane, by virtue of the ball cage 9. The ball shown in FIG. 4 is in vertically uppermost position and similarly all other balls at intermediate positions of rotation will be positioned by the ball cage with their centres on the bisector 22. It will now be seen that if the balls 4 are viewed along the horizontal axis they still occupy a truly circular disposition even though they have moved longitudinally forwards (in the upper segment) and backwards (in the lower segment) from the vertical line and further if the balls are now viewed along the tilted axis of the shaft they still occupy a circular disposition relative to that axis even though the balls are displaced forwards or backwards from the vertical 23 of that axis. Because of this it follows that cyclic uniformity of motion must be maintained because the balls are at all times, at all angles of tilt, rotating in truly circular paths relative to the motion input and relative to the motion output of the joint. It also follows that in order to maintain these circular paths, on the ball bisector plane 22 the balls move in an external elliptical path.

Referring now to FIG. 1, when the joint is at a position of no operating tilt, the grooves 3 and 5 in the inner and outer members are coincident along their axes and a ball of a diameter corresponding to the groove size could fit anywhere along the length of the grooves, but as the balls are maintained by means of the ball cage 9 so that all their centres fall on a common plane and the ball cage by means of its sphericity is positioned so that its centre of sphericity coincides with the plane of the ball centre, then the balls must be maintained on the vertical centre of the joint at all angles or positions of rotations.

In the condition of operating tilt shown in FIG. 4, the center of sphericity coincides with and controls the center of tilt of the joint. The upper and lower pairs of grooves in the inner and outer members in the line of tilt of the shaft are coincident in length along their axes but grooves at intermediate and other angles or rotation will not be coincident except at an intersection point lying on the bisector plane 22. It thus follows that the only possible position in which the ball can satisfactorily fit into and contact both the inner and outer grooves must be on the bisector plane 22 and for this reason the balls must occupy a position in those intermediate grooves with their centres lying on the bisector plane. Thus in operation the ball cage automatically moves relative to, and through half the tilt angle of the inner member.

In the prior art construction referred to above and which incorporates longitudinally arced grooves, the cross-section of these grooves is not truly circular in that the flanks of the grooves are of a greater radius than the ball radius, resulting in what may be termed a Gothic arc, so that the contact point of the ball within its groove occurs at an angle of 45°, or thereabouts, to a vertical plane drawn through the groove and ball centres. One other effect with this type of groove shape is to reduce the surface area contact between the ball and groove so that a motion of the ball within the groove which is not truly a rolling action can be accommodated.

In the present invention, the movement of the ball within the grooves is a true rolling action and therefore the cross-section of the groove can exactly mate with the periphery of the ball. However, for the purpose of manufacture the cross-section of the groove may be of any convenient shape from one permitting full ball contact to a Gothic arc shape. Theoretically it is not necessary to provide clearance between the ball and its groove but in practice for the purpose of manufacturing tolerance some small clearance may be necessary. In some circumstances it may be desirable to provide pre-loading of the balls by forming the grooves of a dimension not larger than the ball radius or diameter.

FIG. 5 shows a similar joint to that described with respect to FIGS. 1 to 4, with the difference that the spherical mating surface 8 between the ball cage and the outer components of the joint has been eliminated. This enables the shaft, inner member, ball and ball cage assembly to be axially free within the outer member, but, as contact is maintained between the ball cage spherical surface and the bore of the outer member between the grooves, the shaft and inner member remain accurately radially located within the assembly.

I claim:

1. A universal joint comprising a shaft, an outer and an inner member mounted concentrically with and axially surrounding said shaft, said inner member supported on and connected to said shaft, said outer and inner members having a plurality of regularly circularly spaced, matching inner and outer grooves respectively, a plurality of balls, a ball locating cage mounted intermediate the outer and the inner members for locating said balls equidistantly spaced with their centres on a common plane, each ball engaged in a groove of said outer and inner members, the mounting for said cage consisting of spherical bearing contact between the internal and external surfaces of the cage and the inner and outer members respectively, the cage thus being mounted for controlling the articulation centre of the joint, said grooves being axial parallel, extending straightly in the axial direction of said members and providing cross-sectional shapes which at least in part closely fit the diameters of the balls therein with minimum sliding friction and high rolling efficiency, whereby the balls roll in their grooves to steer the cage accurately into the bisector plane.

2. A universal joint as set forth in claim 1, wherein the ball-locating means is an part-spherical cage symmetrical about a circumferential bisector formed with a plurality of equally spaced holes having their centres lying on the circumferential bisector of the cage and each of a diameter which in the normal longitudinal direction of the joint is commensurate with that of the balls without a longitudinal clearance, and each hole having circumferentially directed clearance with the ball therein to permit lateral movement of said ball.

3. A universal joint as set forth in claim 2, wherein intermediate the ball-locating holes, the cage makes tangential bearing and guiding contact with the internal surface of the outer member.

4. A universal joint comprising an outer member formed with a cylindrical internal surface having a plurality of straight, axially directed and regularly circularly spaced grooves therein, an annular end member at each end of said outer member, a radially inwardly directed flange on each annular end member, each flange terminating at its radially innermost region in a part-spherical surface, an inner member having an external part-spherical surface in spaced, facing relation with the part-spherical surfaces of said flanges, a plurality of balls, and a part-spherical ball cage mounted intermediate said inner and outer members, the mounting of said cage consisting of spherical bearing contact between the cage and said inner member with the ends of said cage engaging the terminating surfaces of said flanges, said cage being formed with a plurality of equally spaced holes having their centres lying on the circumferential bisector of the cage and each of a diameter which in the axial direction of the joint closely conforms with that of said balls, each hole having circumferentially directed clearance with the ball therein to permit side ways movement of said ball in said hole, whereby the balls roll in the grooves to steer the cage accurately into the bisector plane.

5. A universal joint as set forth in claim 4, wherein at least one of said annular end members is formed integrally with said outer member.

6. A universal joint as set forth in claim 4, further comprising a shaft carrying said inner member and extending from one end of said joint, and wherein the annular end member at the opposite end of the joint is formed as a driving flange.

7. A universal joint as set forth in claim 6, wherein the other annular end member is an end cover comprising a portion surrounding said shaft and a seal engaged between said shaft and said surrounding portion.

8. A universal joint as set forth in claim 6, and a removable, dirt-excluding cover for the adjoining end of the joint mounted on said annular member.

9. A universal joint permitting relative axial movement between input and output members comprising a hollow, cylindrical outer member having its internal cylindrical surface formed with a plurality of straight, equally spaced grooves extending parallel to the axis of the outer member, a shaft protruding into the hollow axial space of the outer member, a part-spherical inner member mounted fixedly on said shaft and located within said outer member and having its part-spherical external surface formed with a plurality of similar and cooperating grooves extending parallel to the axis of the shaft, a part-spherical cage mounted on said inner member within said outer member, the mounting for said cage consisting of spherical bearing contact between said cage and said inner member and of tangential bearing and guiding contact between said cage and the internal cylindrical surface of the outer member intermediate the grooves therein, and an annular set of balls in said cage regularly distributed around the circumferential bisector thereof and engaged one in each pair of cooperating grooves in said inner and outer members, whereby the balls roll in their grooves to steer the cage accurately into the bisector plane.

References Cited by the Examiner

UNITED STATES PATENTS

| | | | |
|---|---|---|---|
| 2,182,455 | 12/1939 | Smith | 64—7 |
| 2,322,570 | 6/1943 | Dodge | 64—21 |
| 2,432,216 | 12/1947 | Suczek | 64—21 |
| 2,615,317 | 10/1952 | Rzeppa | 64—21 |
| 3,176,476 | 4/1965 | Cull | 64—8 |

FRED C. MATTERN, Jr., *Primary Examiner.*

BROUGHTON, G. DURHAM, *Examiner.*

D. H. THIEL, *Assistant Examiner.*